(12) United States Patent
Sumedrea et al.

(10) Patent No.: US 12,524,564 B2
(45) Date of Patent: Jan. 13, 2026

(54) HYBRID SENSITIVE DATA SCRUBBING USING PATTERNS AND LARGE LANGUAGE MODELS

(71) Applicant: Crowdstrike, Inc., Sunnyvale, CA (US)

(72) Inventors: Paul Sumedrea, Bucharest (RO);
Cristian Viorel Popa, Bucharest (RO);
Stefan-Bogdan Cocea, Bucharest (RO);
Mihaela-Petruta Gaman, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 185 days.

(21) Appl. No.: 18/375,112

(22) Filed: Sep. 29, 2023

(65) Prior Publication Data

US 2025/0005175 A1     Jan. 2, 2025

Related U.S. Application Data

(60) Provisional application No. 63/511,549, filed on Jun. 30, 2023.

(51) Int. Cl.
*G06F 21/62* (2013.01)
*G06F 40/284* (2020.01)
*G06N 20/00* (2019.01)

(52) U.S. Cl.
CPC ...... *G06F 21/6227* (2013.01); *G06F 21/6245* (2013.01); *G06F 40/284* (2020.01); *G06N 20/00* (2019.01)

(58) Field of Classification Search
CPC ............. G06F 21/6227; G06F 21/6245; G06F 40/284; G06N 20/00
See application file for complete search history.

(56) References Cited

U.S. PATENT DOCUMENTS

| | | | |
|---|---|---|---|
| 11,755,848 B1* | 9/2023 | Dan ....................... | G06N 20/00 704/270.1 |
| 2020/0327252 A1* | 10/2020 | Mcfall ..................... | G06F 21/78 |
| 2023/0128136 A1* | 4/2023 | Sahu ........................ | G06F 16/41 726/26 |
| 2023/0153462 A1* | 5/2023 | Tutuianu ............. | G06F 16/2462 726/26 |
| 2024/0311509 A1* | 9/2024 | Gong .................. | G06F 21/6254 |

* cited by examiner

*Primary Examiner* — Shirley X Zhang
(74) *Attorney, Agent, or Firm* — Womble Bond Dickinson (US) LLP

(57) ABSTRACT

A system and method of scrubbing sensitive data from records using patterns and large language models (LLM). The method includes receiving a request to process a record comprising data including sensitive data. The method includes identifying, based on one or more regex rules, a first set of scrubbing candidates associated with the record. The method includes identifying, by a processing device and based on a large language model (LLM), a second set of scrubbing candidates associated with the record. The method includes generating, based on the first set of scrubbing candidates and the second set of scrubbing candidates, a scrubbed record by scrubbing the record to remove the sensitive data.

18 Claims, 6 Drawing Sheets

HYBRID SENSITIVE DATA SCRUBBING USING PATTERNS AND LARGE LANGUAGE MODELS

CROSS-REFERENCE TO RELATED APPLICATIONS

This application claims the benefit of U.S. Provisional Application Ser. No. 63/511,549 entitled "HYBRID PERSONAL IDENTIFIABLE INFORMATION SCRUBBING USING PATTERNS AND LARGE LANGUAGE MODELS," filed Jun. 30, 2023, the disclosure of which is incorporated herein by reference in its entirety.

TECHNICAL FIELD

The present disclosure relates generally to data security, and more particularly, to systems and methods of scrubbing sensitive data from records using patterns and large language models (LLM).

BACKGROUND

Sensitive information includes PII (Personally Identifiable Information), copyright, confidential/proprietary information, credentials, Internet Protocol (IP) addresses, and the like. PII is any information that distinguishes an individual from another individual. It is information that can be used by organizations on its own or with other information to identify, contact, or locate a single person, or to identify an individual in context. Organizations use the concept of PII to understand which data they store, process and manage that identifies people and may carry additional responsibility, security requirements, and in some cases legal or compliance requirements.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
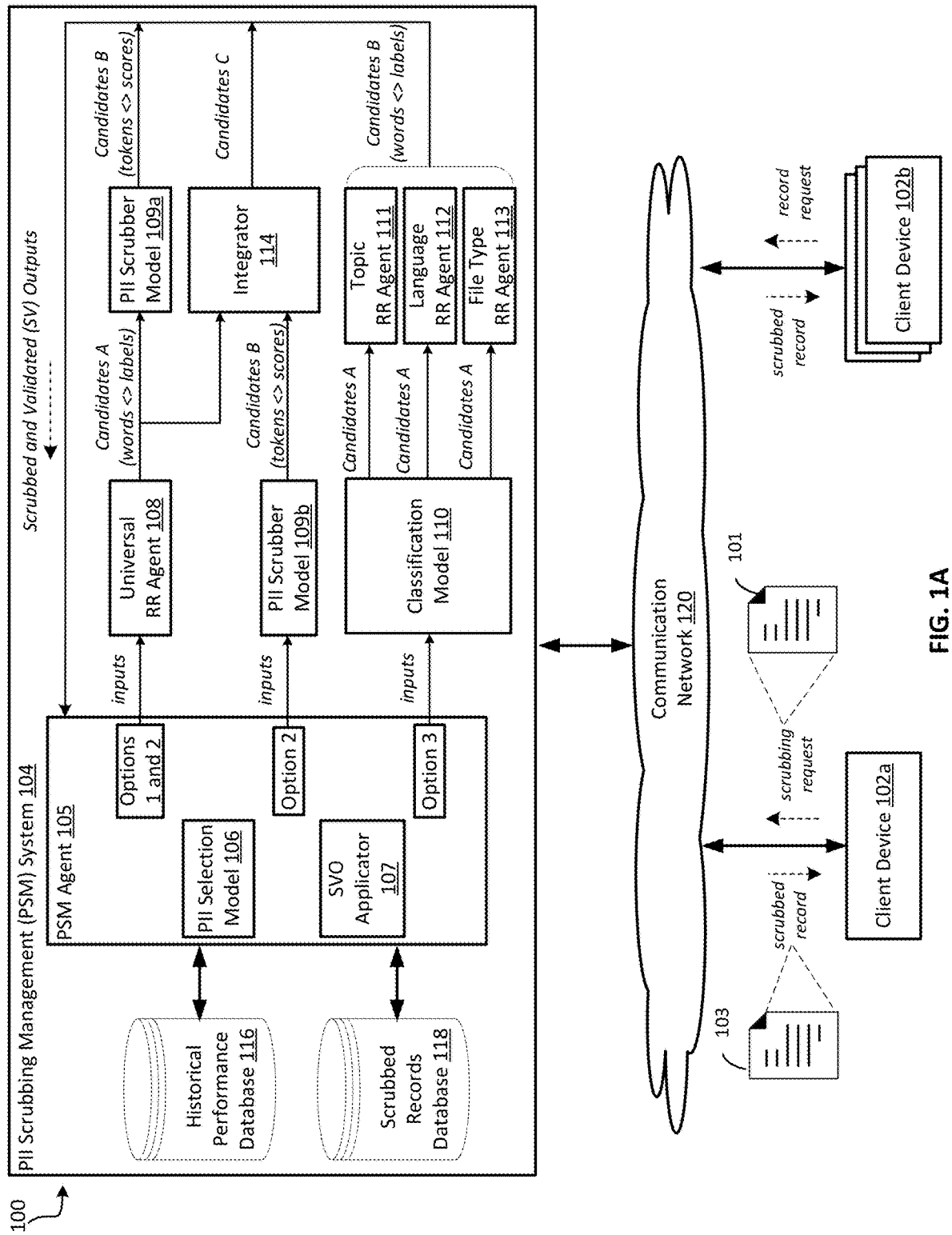
FIG. 1A is a block diagram depicting an example environment for scrubbing personal identifiable information (PII) from records using patterns and large language models (LLMs), according to some embodiments.

The present disclosure is applicable to various types of sensitive information, such as PII or otherwise (e.g., copyright, confidential/proprietary information, credentials, and/or Internet Protocol (IP) addresses). For simplicity, the remainder of this disclosure will refer to sensitive information as PII.

Per recent privacy regulations (e.g., General Data Protection Regulation (GDPR) and California Consumer Privacy Act (CCPA)) and the costly repercussions that their violation implies, PII scrubbing of data, although a difficult problem, became an essential part of handling and storing data. Identifying sensitive information is a prerequisite of any scrubbing procedure.

Current technologies for scrubbing data use one of two methods. A first method involves pattern matching through regular expression, also referred to regex rules. A regex rule is a sequence of characters that specifies a match pattern in text. Usually, such patterns are used by string-searching algorithms for "find" or "find and replace" operations on strings, or for input validation. A second method involves machine learning (ML) that is focused on named entity recognition (NER), where recent works employ large language models (LLMs). A LLM is a computerized language model consisting of an artificial neural network with many parameters, trained on large quantities of unlabeled text using self-supervised learning or semi-supervised learning.

However, these conventional methods have several disadvantages. While regex rules prove to be effective for some categories of PIIs (e.g., IP address), for others (e.g., locations) acceptable detection accuracy requires near-impossible complexities of the rules to capture all the variations in which PIIs can be shared. This reveals a drawback of regex rules, that is, the lack of context around a pattern. Regex rules are also prone to false negatives, resulting in aggressive scrubbing which removes information useful for detection. LLMs can be used for PII identification and scrubbing because of their ability to detect named entities by design through learning from vast amounts of labelled data. But LLMs can be noisy and generate non-trivial numbers of false positives (e.g., usernames in an operating system path). Thus, there is a long-felt but unsolved need to solve the problems of improving the ability for a computing device to accurately identify and scrub PII from records (e.g., data, files, and/or so on).

Aspects of the present disclosure address the above-noted and other deficiencies by scrubbing personal identifiable information (PII) from records using patterns and large language models (LLM). The embodiments of the present disclosure combine the benefits of pattern matching through regex rules and LLMs powered by NER in a hybrid PII scrubbing system towards an improved data processing pipeline that allows rapid prototyping while maximizing coverage even for the most complex of entities. That is, incorporating LLMs as part of a sensitive data protection pipeline provides significant advantages over the conventional system, especially when the scrubbed contents can be automatically generated using LLMs and not just classified as-is. The embodiments of the present disclosure also provide a mechanism for automatic routing of sensitive data using LLMs to the appropriate scrubbing pipeline, according to its particularities.

In an illustrative embodiment, a PII scrubbing management (PSM) system receives a request (e.g., scrubbing request) to process a record that includes data and PII. The PSM system identifies, by a processing device and based on one or more regex rules, a first set of scrubbing candidates associated with the record. The PSM system identifies, based on a large language model (LLM), a second set of scrubbing candidates associated with the record. The PSM system generates, based on the first set of scrubbing candidates and the second set of scrubbing candidates, a scrubbed record by scrubbing the record to remove the PII.

As discussed herein, scrubbing a record may include removing PII from a first record, duplicating the first record to create a second record (sometimes referred to as scrubbed record) and removing PII from the second record, and/or generating a second record that includes the data of the first record but not the PII of the first record.

FIG. 1A is a block diagram depicting an example environment for scrubbing personal identifiable information (PII) from records using patterns and large language models (LLM), according to some embodiments. The environment 100 includes a PII scrubbing management (PSM) system 104 and one or more client devices 102 (client device 102a, 102b, etc.) that are communicably coupled together via a communication network 120. The PSM system 104 includes and/or executes a PSM agent 105, which in turn, includes and/or executes a PII selection model 106 and a scrubbed and validated output (SVO) applicator 107. The PSM system 104 includes and/or executes a universal regex rules (RR) agent 108, an integrator 114, a classification model 110, a topic RR agent 111, a language RR agent 112, and a file type RR agent. The PSM system 104 includes PII scrubber models 109a and 109b, each configured to have identical functionality. In some embodiments, a single PII scrubber model 109 may be used in place of two PII scrubber models 109a, 109b. The PSM agent 105 includes a historical performance database 116 and a scrubbed records database 118.

The PSM agent 105 may receive a request (shown in FIG. 1 as, scrubbing request) to scrub (e.g., remove or reduce) PII from a record 101. The request may include the record 101 or an identifier to the record 101. A record 101 may be any electronic data including, for example, a document, a file, a photograph, a video, an audio file, a database, a command line, a script, and/or the like. A record 101 may include non-PII data (sometimes referred to as, data) and PII data (sometimes referred to as, PII).

The PSM agent 105 may process the record 101 by selecting one of three options (sometimes referred to as, "scrubbing procedures") to scrub PII from the record 101. If the PSM agent 105 selects option 1, then the PSM agent 105 sends the record 101 to the universal RR agent 108, which is configured to generate a first set of scrubbing candidates (shown in FIG. 1 as, candidates A) based on the record 101, where a scrubbing candidate is indicative of an item of PII in the record 101. In some embodiments, the universal RR agent 108 generates the first set of scrubbing candidates by generating, based on the record 101, a plurality of labels that are associated with a plurality of words of the record 101. Each label (e.g., yes or no) indicates whether a respective word of the plurality of words of the record 101 corresponds to PII.

The universal RR agent 108 provides the first set of scrubbing candidates to the PII scrubber model 109a. The PII scrubber model 109a is trained, using a first set of training data, to identify a second set of scrubbing candidates (shown in FIG. 1 as, candidates B) based on the first set of scrubbing candidates. In some embodiments, the PII scrubber model 109a generates the second set of scrubbing candidates by generating, based on the record 101 and using lexical analysis, a plurality of tokens associated with a plurality of scores. Each score indicates a likelihood of a respective token being associated with an item of PII. A token may include, for example, one or more numbers, variable names, parentheses, arithmetic operators, statement terminators, and/or the like.

The second set of scrubbing candidates may include all of the first set of scrubbing candidates. For example, if the first set of scrubbing candidates includes PII-1, PII-2, and PII-3, then the second set of scrubbing candidates may also include PII-1, PII-2, and PII-3. In some embodiments, the second set of scrubbing candidates may be a subset of the first set of scrubbing candidates. For example, if the first set of scrubbing candidates includes PII-1, PII-2, and PII-3, then the second set of scrubbing candidates might include PII-1 and PII-2, but not PII-3.

The PII scrubber model 109a sends the second set of scrubbing candidates (sometimes referred to as scrubbed and validated (SV) outputs) to the PSM agent 105. The PSM agent 105 uses the SVO applicator 107 to remove PII associated with the second set of scrubbing candidates from the record 101 to generate a scrubbed record 103. Alternatively, the PSM agent 105 may use the SVO applicator 107 to generate a copy (sometimes referred to as, scrubbed record 103) of the record 101, where the PII associated with the second set of scrubbing candidates is absent (e.g., missing) from the copy of the record 101.

If the PSM agent 105 selects option 2, then the PSM agent 105 sends the record 101 to the universal RR agent 108 and the PII scrubber model 109b. As discussed above, the universal RR agent 108 generates a first set of scrubbing candidates and sends the first set of scrubbing candidates to the integrator 114. The PII scrubber model 109b generates a second set of scrubbing candidates (shown in FIG. 1 as, candidates B) based on the record 101, where a scrubbing candidate is indicative of an item of PII in the record 101. The PII scrubber model 109b sends the second set of scrubbing candidates to the integrator 114.

The integrator 114 is configured to generate, based on the first set of scrubbing candidates and the second set of scrubbing candidates, a third set of scrubbing candidates. The integrator 114 send the third set of scrubbing candidates (sometimes referred to as SV outputs) to the PSM agent 105, which in turn, uses the SVO applicator 107 to remove PII associated with the third set of scrubbing candidates from the record 101.

If the PSM agent 105 selects option 3, then the PSM agent 105 sends the record 101 to the classification model 110. The classification model 110 is an LLM that is trained, using a second set of training data, to classify the record 101 and generate one or more classification parameters that are indicative of at least one of a topic type of the record 101, a language type (e.g., English, German, Python, C/C++, and/or the like) of the record 101, or a file type (e.g., PDF, docx) of the record 101. The PSM agent 105 selects, based on the one or more classification parameters, a single regex engine from the plurality of regex engines (e.g., topic RR agent 111, language RR agent 112, file type RR agent 113) of the PSM system 104 that is most likely to accurately identify the PPI in the record 101. The selected regex engine generates a second set of scrubbing candidates (shown in FIG. 1 as, candidates B) based on the output from the classification model 110 and sends the second set of scrubbing candidates (sometimes referred to as SV outputs) to the PSM agent 105, which in turn, uses the SVO applicator 107 to remove PII associated with the second set of scrubbing candidates from the record 101.

In some embodiments, the PSM agent 105 may use the PII selection model 106 to select the best scrubbing procedure (e.g., option 1, option 2, or option 3). The PII selection model 106 is an LLM model that is trained, using a third set of training data, to predict, based on the record, the performances of the scrubbing procedures. The third set of training data may include a mapping between a plurality of historical records and historical performances of the scrubbing procedures. The PSM agent 105 selects the particular scrubbing procedure that produces the best (e.g., optimal) performance of the scrubbing procedures based on the record 101. The PSM agent 105 processes the record 101 according to the best scrubbing procedure.

In some embodiments, the scrubbing request may include an indication of a particular scrubbing procedure. In response to receiving the scrubbing request, the PSM agent 105 may select the particular scrubbing procedure and process the record 101 according to the particular scrubbing procedure.

The PSM agent 105 stores the scrubbed record 103 in the historical performance database 116. The PSM agent 105 sends the scrubbed record 103 to a client device 102 (e.g., client device 102a, 102b, etc.) in response to receiving a request for the record 101.

The communication network 120 may be a public network (e.g., the internet), a private network (e.g., a local area network (LAN) or wide area network (WAN), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

A PSM system 104 and client device 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

A PSM system 104 may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The PSM system 104 may use the same type or different types of virtual environments. For example, all of the PSM systems 104 may be VMs. In another example, all of the PSM systems 104 may be containers. In a further example, some of the PSM systems 104 may be VMs, other PSM systems 104 may be containers, and other PSM systems 104 may be computing devices (or groups of computing devices).

In some embodiments, either one or both of the classification model 110 and the PII selection model 106 may be any type of machine learning model. Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing the mathematical and computational frameworks used to extract patterns and insights from data. Large language models, a specialized category within machine learning models, are trained on vast amounts of text data to capture the nuances of language and context. By combining advanced machine learning techniques with enormous datasets, large language models harness data-driven approaches to achieve highly sophisticated language understanding and generation capabilities. As discussed herein, artificial intelligence models, or AI models, include machine learning models, large language models, and other types of models that are based on neural networks, genetic algorithms, expert systems, Bayesian networks, reinforcement learning, decision trees, or combination thereof.

Still referring to FIG. 1, a PII scrubbing management (PSM) system 104 receives a request (e.g., scrubbing request) to process a record that includes data and PII. The PSM system 104 identifies, based on one or more regex rules, a first set of scrubbing candidates associated with the record. The PSM system 104 identifies, based on a large language model (LLM), a second set of scrubbing candidates associated with the record. The PSM system 104 generates, based on the first set of scrubbing candidates and the second set of scrubbing candidates, a scrubbed record by scrubbing the record to remove the PII Although FIG. 1 shows only a select number of computing devices (e.g., PSM system 104, client devices 102); the environment 100 may include any number of computing devices that are interconnected in any arrangement to facilitate the exchange of data between the computing devices.

Figure 1B:
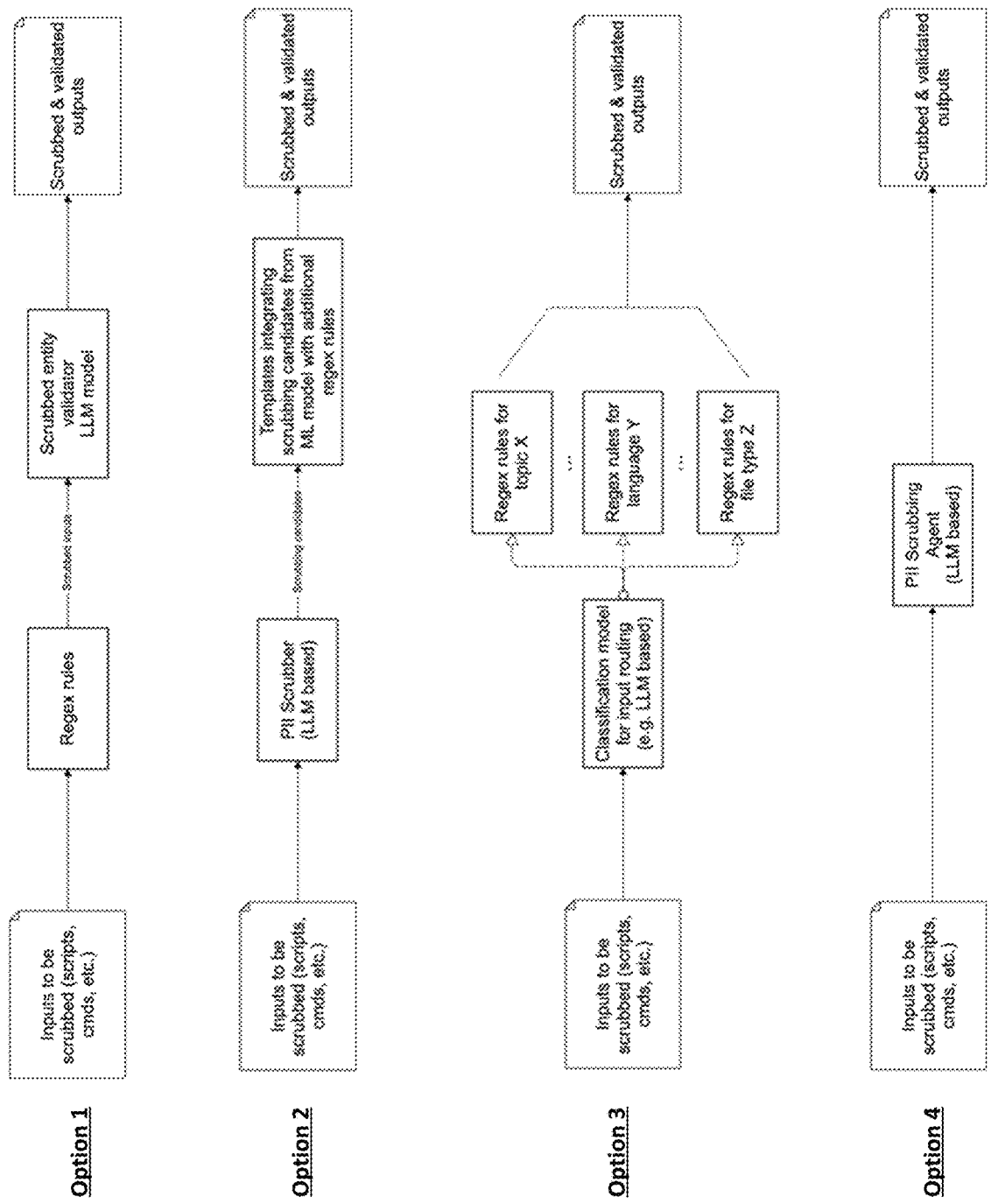
FIG. 1B is a block diagram depicting various methods for scrubbing PII from records using patterns and LLMs, according to some embodiments.

FIG. 1B is a block diagram depicting various options for scrubbing personal identifiable information (PII) from records using patterns and large language models (LLM), according to some embodiments. The PSM system 104 may perform each of the options in FIG. 1B, which correspond to the options of FIG. 1A. For example, option 1 in FIG. 1B corresponds to option 1 in FIG. 1A, option 2 in FIG. 1B corresponds to option 2 in FIG. 1A, and option 3 in FIG. 1B corresponds to option 3 in FIG. 1A. Furthermore, option 4 in FIG. 1B corresponds to the embodiment discussed with respect to FIG. 1A, where the PSM agent 105 may use the PII selection model 106 to select the best scrubbing procedure (e.g., option 1, option 2, or option 3).

To perform Option 1, the PSM system 104 pre-filters the candidates for scrubbing via regex rules, then validates which tokens to scrub using an LLM trained to recognize named entities. LLM training for name entity recognition (NER), in this case, implies one of three alternatives: (1) training from scratch, (2) fine-tuning an existing base model, or (3) use an active learning paradigm to minimize the data needs.

There are several benefits of this option. First, the false negatives (FNs) are reduced. Second, this option removes the time-consuming fine tuning of rule, especially when there is known structure that can be leveraged to directly extract the entities that need to be scrubbed.

To perform Option 2, the PSM system 104 trains an LLM on the NER task and validates its predictions via regex rules or integrate predictions into templates.

There are several benefits of this option. First, there is a reduction in false positives (FPs) of the LLM for NER through its integration into a rule-based system. Second, the hybrid system based on LLM and regex rules can be a good starting point even when the PSM system 104 starts from (e.g., uses) noisy labels. The PSM system 104 can rely on the set of rules to correct model outputs in place based on observations/audits of the LLM in production. This, this option alleviates problems stemming from white/grey box adversarial attacks of the PSM system 104. This scenario can happen if the attackers find out details about the PII masking tokens.

To perform Option 3, the PSM system 104 includes and uses a classification model 110 that can route the scrubbing based on the (type of) input. The input is then routed towards a set of regex rules designed for scrubbing the entities identified. The PSM system 104 may include an LLM-based routing component, which can be refined through reinforcement learning with human feedback (RLHF) or any other type of policy optimization technique either human or AI generated. In some embodiments, the PSM system 104 may use supervised learning to detect the input type.

There are several benefits of this option. First, using LLM refined via RLHF in the routing component will have lower costs in terms of data collection than doing a supervised fine-tuning.

To perform Option 3, the PSM system 104 uses the PII selection model 106 (e.g., an LLM model) to decide which method is a better fit. This can be the same LLM that does the scrubbing or a different one.

There are several benefits of this option. First, this option combines multiple of the aforementioned techniques as drop-in replacements and delegate the decision-making process to an LLM agent. This can provide a good initial baseline for a new target domain in which scrubbing is required, facilitating an initial audit and automating part of the planning process for the scrubbing pipeline.

An important mention is that the actual PII detection/scrubbing LLM is flexible in design. It can be a NER-type system that assigns a PII probability to each token in the content or it could be a generative model that outputs a scrubbed version of the input. This choice made by the PSM system 104 is important given that some closed-source LLMs are better text generators natively through API than they are classifiers (apart from extensive and sometimes brittle prompting being applied in the latter case).

Named Entity Recognition (NER) in ML

Using machine learning (ML), the PSM system 104 can map the PII/sensitive data identification task to the canonical task of named entity recognition (NER). NER involves detecting and categorizing important information in text known as named entities. These named entities can range from person names and social security number to a home address or an email address and a password.

For a ML model (e.g., classification model 110), named entities are split up into tokens that it needs to classify. A label is attributed to each token as follows: (1) there is a label marking the beginning of a named entity (usually denoted as B-), (2) another label for tokens which are inside a named entity (usually denoted as I-), (3) and one label for tokens belonging to "no entity" (usually denoted as O).

Tokenization of Named Entities

For example, if we have a sentence such as: "EU rejects German call to boycott British company owned by David Johnson." The PSM system 104 labels the named entities (word-label pairs), where MISC is a named entity that the PSM system 104 can use to denote more than one class (for example the PSM system 104 might include in the same class both nationality and political orientation and mark them with the same MISC label):
"EU"—ORG
"rejects"—O
"German"—MISC
"call"—O
"to"—O
"boycott"—O
"British"—MISC
"company"—O
"owned"—O
"by"—O
"David"—PERS
"Johnson."—PERS Then the PSM system 104 applies a tokenizer on these words. The tokenization process represents splitting words into "sub-words", where the sub-words are parts of the word (these sub-words are also named ngrams) which appear very frequently inside a body of text such that the PSM system 104 represents them separately as part of a vocabulary. Sometimes these tokens (sub-words) might extend beyond a word limit, but the PSM system 104 can enforce a hard stop at the word boundary in the decoding process. An ngram is a collection of n successive items in a text document that may include words, numbers, symbols, and/or punctuation.

Continuing with the above example, applying the tokenizer allows the PSM system 104 to get labels for each token automatically given that the PSM system 104 knows the position of each token relative to the PII words in the text. This process is automatic. So, for example, the PSM system 104 might get something like:
"EU" B-ORG
"rejects"—O
"Ger"—B-MISC
"man c"—I-MISC
"all"—O
"to"—O
"boy"—O
"cott"—O
"Brit"—B-MISC
"ish"—I-MISC
"comp"—O
"any"—O
"own"—O
"ed by"—O
"David"—B-PERS
"Jo"—B-PERS
"hn"—I-PERS
"son."—I-PERS When tokenized a named entity can be represented only by a beginning token (such as B-PERS) or as a combination of a single beginning token and multiple intermediate tokens (such as B-PERS, I-PERS, I-PERS for the last word in the example sentence).

Sub-words get formed by the tokenizer which applies a known algorithm (e.g., WordPiece, SentencePiece) to the sentence such that the PSM system 104 gets the most probable tokens/sub-words. These tokens can extend beyond a single word as can be seen with "man c" for example). This token specifically contains both part of a PII as well as part of a regular word. The PSM system 104 will settle this in the decoding step.

A single word which is not PII can be composed of multiple tokens labeled O or just a single token to represent the whole word (marked as O).

PII Identification-Inference Details

The model learns to classify all these tokens by minimizing a loss function (e.g., a cross entropy loss). Each token from the text is classified by the model. And given that the PSM system 104 knows where it extracted the token from it means that it also knows where that token is positioned in the sentence based on numerical indices (e.g., "Ger" covers positions 9, 10 and 11; numbering starts from 0). This is useful for masking the PIIs the PSM system 104 identifies and replacing them in the text at the correct position. This is a multi-class classification setting; hence each token gets some probabilities summing to one which attributes it to all the classes (e.g., B-ORG, B-MISC, I-MISC, B-PERS, I-PERS and O). In other words, each token has a distribution of probabilities for each possible class adding up to 1 (e.g., 0.1 for non-PII, 0.3 for organization, 0.6 for person).

Based on these probabilities, as well as the positions of the tokens the PSM system 104 can apply a greedy decoding step in order to map the tokens that the PSM system 104 classifies to words and thus label the words as PIIs. Some rules may apply here, of which the PSM system 104 may implement one or more of the rules.

First Rule(s): The PSM system 104 starts searching for sequences starting with a "B-" like token and also check if they have any "I-" like tokens after them, the PSM system 104 only match them if they refer to the same type of entity (e.g., it merges B-PERS only with I-PERS to decode the label PERS for the whole word, not B-ORG with I-PERS).

Second Rule(s): Entities starting with "B-" (e.g., "B-ORG" from above denoting the "EU") can be converted standalone to ORG (no need for an "I-" like token).

Third Rule(s): No PII word can begin with a "I-" like token, if there is no "B-" like token before it, the PSM system 104 does not count this classification as being correct and it does not mark the word as PII.

Fourth Rule(s): In the case where a token classified as potentially PII by the model extends the word boundary (which is defined by the word being followed by something like a space or a carriage return for example), the PSM system 104 makes sure to check the indices of each character which is part of the token as stop before the punctuation sign. So, for:

"Ger"—B—MISC
"man c"—I—MISC

The PSM system 104 decodes this as "German"—MISC and for the "c" the PSM system 104 checks what the next classified token says. If it is "O" then it also maps "c" to label O and merge "c" with "all" to "call"—O. If "all" would have been a word such as "I-PERS" with a very high confidence (say probability 99%) the PSM system 104 would have transformed "c" to B-PERS and decoded "c"—B-PERS, "all"—I-PERS to "call"—PERS (this assignment can be made by varying a threshold for the probability, it can be >99% or >X %).

Fifth Rule(s): Since each token comes with a probability attached, when decoding the PSM system 104 can multiply these probabilities such that it also gets a confidence for the word being PII or not.

The above example (using greedy decoding) serves as an explanation on how a machine learning model splitting up text into tokens and classifying each token goes from text to tokens and back to text while also adding these labels which denote PII to certain words. In the example, the PSM system 104 only marked organization (ORG), person (PERS), miscellaneous (MISC) and other (O) as classes to choose from but a person of ordinary skill in the art can imagine many more for all other PIIs, such as passwords emails, etc.

With the model identifying which words are PII candidates (e.g., with an assigned confidence which the PSM system 104 can threshold towards YES or NO) and with reference to Option 2, the following conditions may apply:

Condition 1: An ML model (e.g., classification model 110 in FIG. 1) may provide PII candidates. In some embodiments, the ML model may attach confidence values to each PII candidate.

Condition 2: The regex rules may provide PII candidates (with confidence value pre-determined, it can be 1 if the PSM system 104 has a high (e.g., above a threshold) confidence in a particular rule, or a rule can be weighted say with confidence 0.5 if the PSM system 104 knows it to be less effective in practice from empirical observations).

These two sets of candidates get composed into templates. For example, for an email address such as john.doe@domain.com, it might the following: (1) PII model predicted EMAIL with confidence 0.1 (so the model tends to believe that this is not really an e-mail); and (2) regex rule (denoted as "regex_rule_email") with high confidence checking for "@domain.com" being part of the string says this is PII.

Thus, for a template such as PII_model_confidence>0.5 OR "regex_rule_email"==TRUE the PSM system 104 would recognize that john.doe@domain.com truly is an EMAIL.

Figure 2A:
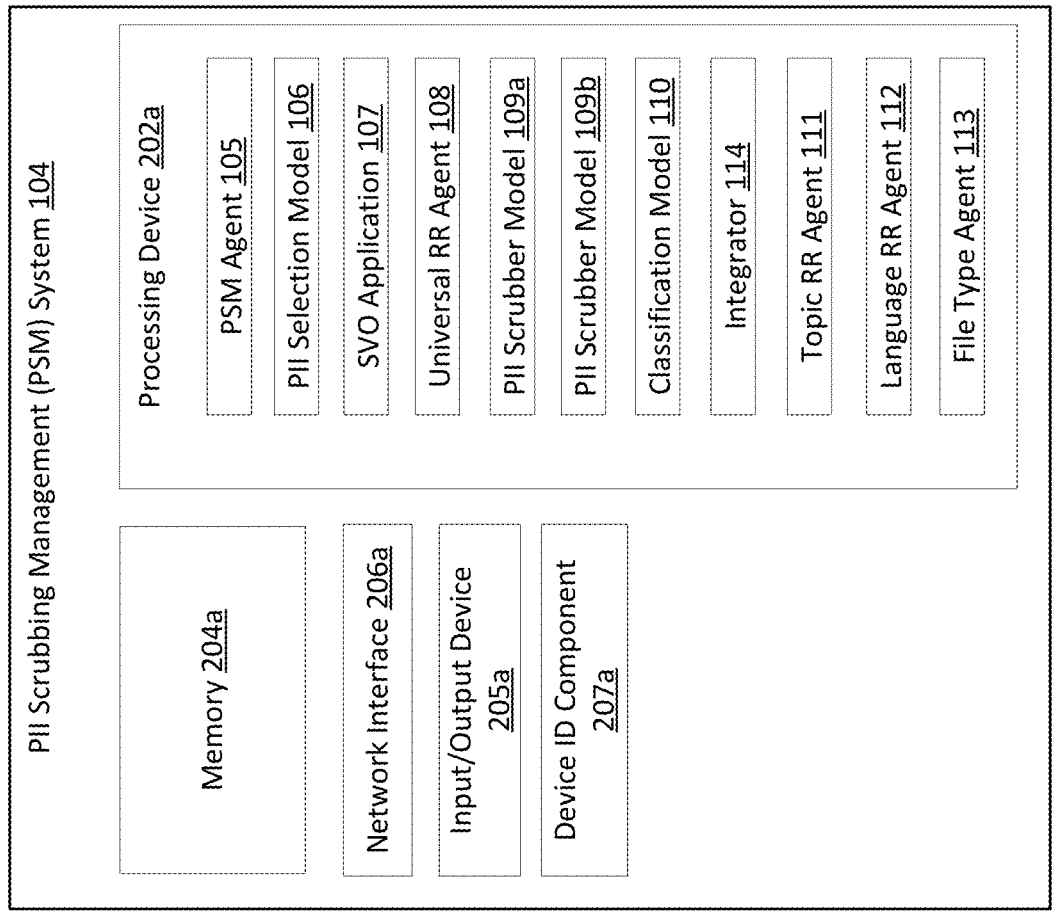
FIG. 2A is a block diagram depicting an example of the PII scrubbing management (PSM) system of the environment in FIG. 1, according to some embodiments.

In some embodiments, these composition rules for templates might be simple Boolean expressions as above or they might extend to IF . . . ELSE statements such as:

IF PII model_confidence<0.3 AND regex_rule_X THEN PII=True
ELSE IF PII_model_confidence<0.5 AND regex_rule_Y===FALSE THEN PII=False
ELSE IF PII model_confidence>0.5 AND regex_rule Y==FALSE OR
regex_rule_X==TRUE Then PII=TRUE FIG. 2A is a block diagram depicting an example of the PII scrubbing management (PSM) system of the environment in FIG. 1, according to some embodiments. While various devices, interfaces, and logic with particular functionality are shown, it should be understood that the PSM system 104 includes any number of devices and/or components, interfaces, and logic for facilitating the functions described herein. For example, the activities of multiple devices may be combined as a single device and implemented on the same processing device (e.g., processing device 202*a*), as additional devices and/or components with additional functionality are included.

The PSM system 104 includes a processing device 202*a* (e.g., general purpose processor, a PLD, etc.), which may be composed of one or more processors, and a memory 204*a* (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the PSM system 104. In some embodiments, the processing device 202a and the memory 204a form various processing devices and/or circuits described with respect to the PSM system 104. The instructions include code from any suitable computer programming language such as, but not limited to, C, C++, C#, Java, JavaScript, VBScript, Perl, HTML, XML, Python, TCL, and Basic.

The processing device 202 executes a PSM agent 105, a PII selection model 106, an scrubbed and validated output (SVO) Application 107, a universal regex rules (RR) agent 108, a PII scrubber model 109a, a PII scrubber model 109b, a classification model 110, an integrator 114, a topic RR agent 111, a language RR agent 112, and a file type RR agent 113.

The PSM agent 105 may be configured to receive a request (shown in FIG. 1 as, scrubbing request) to scrub PII from a record 101. The request may include the record 101 or an identifier to the record 101. A record 101 may be any electronic data including, for example, a document, a file, a photograph, a video, an audio file, a database, a command line, a script, and/or the like. A record 101 may include non-PII data and PII data.

The PSM agent 105 may be configured to process the record 101 by selecting one of three options (e.g., scrubbing procedures) to scrub PII from the record 101. If the PSM agent 105 selects option 1, then the PSM agent 105 sends the record 101 to the universal RR agent 108, which is configured to generate a first set of scrubbing candidates based on the record 101, where a scrubbing candidate is indicative of an item of PII in the record 101. In some embodiments, the universal RR agent 108 generates the first set of scrubbing candidates by generating, based on the record 101, a plurality of labels that are associated with a plurality of words of the record 101. Each label (e.g., yes or no) indicates whether a respective word of the plurality of words of the record 101 corresponds to PII.

The universal RR agent 108 provides the first set of scrubbing candidates to the PII scrubber model 109a. The PII scrubber model 109a is trained, using a first set of training data, to identify a second set of scrubbing candidates based on the first set of scrubbing candidates. In some embodiments, the PII scrubber model 109a generates the second set of scrubbing candidates by generating, based on the record 101 and using lexical analysis, a plurality of tokens associated with a plurality of scores. Each score indicates a likelihood of a respective token being associated with an item of PII. A token may include, for example, one or more numbers, variable names, parentheses, arithmetic operators, statement terminators, and/or the like.

The second set of scrubbing candidates may include all of the first set of scrubbing candidates. For example, if the first set of scrubbing candidates includes PII-1, PII-2, and PII-3, then the second set of scrubbing candidates may also include PII-1, PII-2, and PII-3. In some embodiments, the second set of scrubbing candidates may be a subset of the first set of scrubbing candidates. For example, if the first set of scrubbing candidates includes PII-1, PII-2, and PII-3, then the second set of scrubbing candidates might include PII-1 and PII-2, but not PII-3.

The PII scrubber model 109a sends the second set of scrubbing candidates to the PSM agent 105. The PSM agent 105 uses the SVO applicator 107 to remove PII associated with the second set of scrubbing candidates from the record 101 to generate a scrubbed record 103. Alternatively, the PSM agent 105 may use the SVO applicator 107 to generate a copy of the record 101, where the PII associated with the second set of scrubbing candidates is absent (e.g., missing) from the copy of the record 101.

If the PSM agent 105 selects option 2, then the PSM agent 105 sends the record 101 to the universal RR agent 108 and the PII scrubber model 109b. As discussed above, the universal RR agent 108 generates a first set of scrubbing candidates and sends the first set of scrubbing candidates to the integrator 114. The PII scrubber model 109b generates a second set of scrubbing candidates based on the record 101, where a scrubbing candidate is indicative of an item of PII in the record 101. The PII scrubber model 109b sends the second set of scrubbing candidates to the integrator 114.

The integrator 114 is configured to generate, based on the first set of scrubbing candidates and the second set of scrubbing candidates, a third set of scrubbing candidates. The integrator 114 send the third set of scrubbing candidates to the PSM agent 105, which in turn, uses the SVO applicator 107 to remove PII associated with the third set of scrubbing candidates from the record 101. In some embodiments, the records 101 includes a plurality of portions of PII. In this embodiment, the PSM agent 105 uses the SVO applicator 107 to remove all portions of the PII from the record 101.

Alternatively, in some embodiments, the PSM agent 105 uses the SVO applicator 107 to remove only a single portion of PII from the record 101, but leave the other portions of the PII in the record 101. For example, the record may include a first PII item (e.g., a person's name) and a second PII (e.g., a person's social security number). The PSM agent 105 may use the SVO applicator 107 to remove the first portion of PII from the record 101, but leave the second portion of PII in the record 101.

If the PSM agent 105 selects option 3, then the PSM agent 105 sends the record 101 to the classification model 110. The classification model 110 is an LLM that is trained, using a second set of training data, to classify the record 101 and generate one or more classification parameters that are indicative of at least one of a topic type of the record 101, a language type (e.g., English, German, Python, C/C++, and/or the like) of the record 101, or a file type (e.g., PDF, docx) of the record 101. The PSM agent 105 selects, based on the one or more classification parameters, a single regex engine from the plurality of regex engines (e.g., topic RR agent 111, language RR agent 112, file type RR agent 113) of the PSM system 104 that is most likely to accurately identify the PPI in the record 101.

In some embodiments, the PSM agent 105 may use the PII selection model 106 to select the best scrubbing procedure (e.g., option 1, option 2, or option 3). The PII selection model 106 is an LLM model that is trained, using a third set of training data, to predict, based on the record, the performances of the scrubbing procedures. The third set of training data may include a mapping between a plurality of historical records and historical performances of the scrubbing procedures. The PSM agent 105 selects the particular scrubbing procedure that produces the best (e.g., optimal) performance of the scrubbing procedures based on the record 101. The PSM agent 105 processes the record 101 according to the best scrubbing procedure.

In some embodiments, the scrubbing request may include an indication of a particular scrubbing procedure. In response to receiving the scrubbing request, the PSM agent 105 may select the particular scrubbing procedure and process the record 101 according to the particular scrubbing procedure.

The PSM agent 105 stores the scrubbed record 103 in the historical performance database 116. The PSM agent 105 sends the scrubbed record 103 to a client device 102 (e.g., client device 102a, 102b, etc.) in response to receiving a request for the record 101.

The PSM system 104 includes a network interface 206a configured to establish a communication session with a computing device for sending and receiving data over the communication network 120 to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the PSM system 104 includes a plurality of network interfaces 206a of different types, allowing for connections to a variety of networks, such as local area networks (public or private) or wide area networks including the Internet, via different sub-networks.

The PSM system 104 includes an input/output device 205a configured to receive user input from and provide information to a user. In this regard, the input/output device 205a is structured to exchange data, communications, instructions, etc. with an input/output component of the PSM system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the PSM system 104, such as a built-in display, touch screen, microphone, etc., or external to the housing of the PSM system 104, such as a monitor connected to the PSM system 104, a speaker connected to the PSM system 104, etc., according to various embodiments. In some embodiments, the PSM system 104 includes communication circuitry for facilitating the exchange of data, values, messages, and the like between the input/output device 205a and the components of the PSM system 104. In some embodiments, the input/output device 205a includes machine-readable media for facilitating the exchange of information between the input/output device 205a and the components of the PSM system 104. In still another embodiment, the input/output device 205a includes any combination of hardware components (e.g., a touchscreen), communication circuitry, and machine-readable media.

The PSM system 104 includes a device identification component 207a (shown in FIG. 2A as device ID component 207a) configured to generate and/or manage a device identifier associated with the PSM system 104. The device identifier may include any type and form of identification used to distinguish the PSM system 104 from other computing devices. In some embodiments, to preserve privacy, the device identifier may be cryptographically generated, encrypted, or otherwise obfuscated by any device and/or component of the PSM system 104. In some embodiments, the PSM system 104 may include the device identifier in any communication (e.g., classifier performance data, input message, parameter message, etc.) that the PSM system 104 sends to a computing device.

The PSM system 104 includes a bus (not shown), such as an address/data bus or other communication mechanism for communicating information, which interconnects the devices and/or components of the PSM system 104, such as processing device 202a, network interface 206a, input/output device 205a, and device ID component 207a.

In some embodiments, some or all of the devices and/or components of PSM system 104 may be implemented with the processing device 202a. For example, the PSM system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
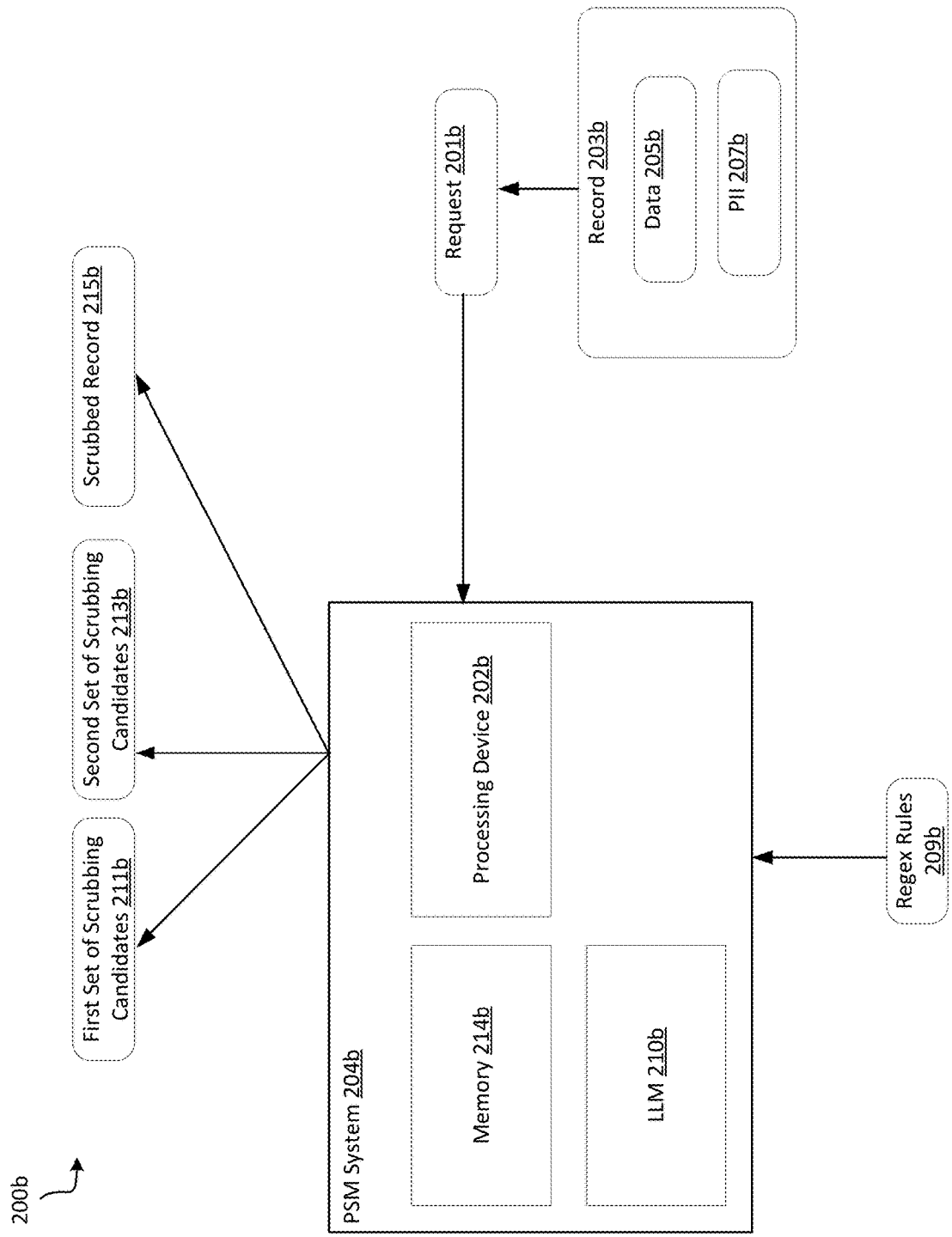
FIG. 2B is a block diagram depicting an example environment for using a PSM system, according to some embodiments.

FIG. 2B is a block diagram depicting an example environment for using a PSM system, according to some embodiments. A PSM system 204b (e.g., PSM system 104 in FIG. 1) may include a memory 214b and a processing device 202b that is operatively coupled to the memory 214b. The processing device 202b may receive a request 201b to process a record 203b that includes data 205b and PII 207b. The processing device 202b may identify, based on one or more regex rules 209b, a first set of scrubbing candidates 211b associated with the record 203b. The processing device 202b may identify, based on an LLM 210b, a second set of scrubbing candidates 213b associated with the record 203b. The processing device 202b may generate, based on the first set of scrubbing candidates 211b and the second set of scrubbing candidates 213b, a scrubbed record 215b by scrubbing the record 203b to remove the PII 207b.

Figure 3:
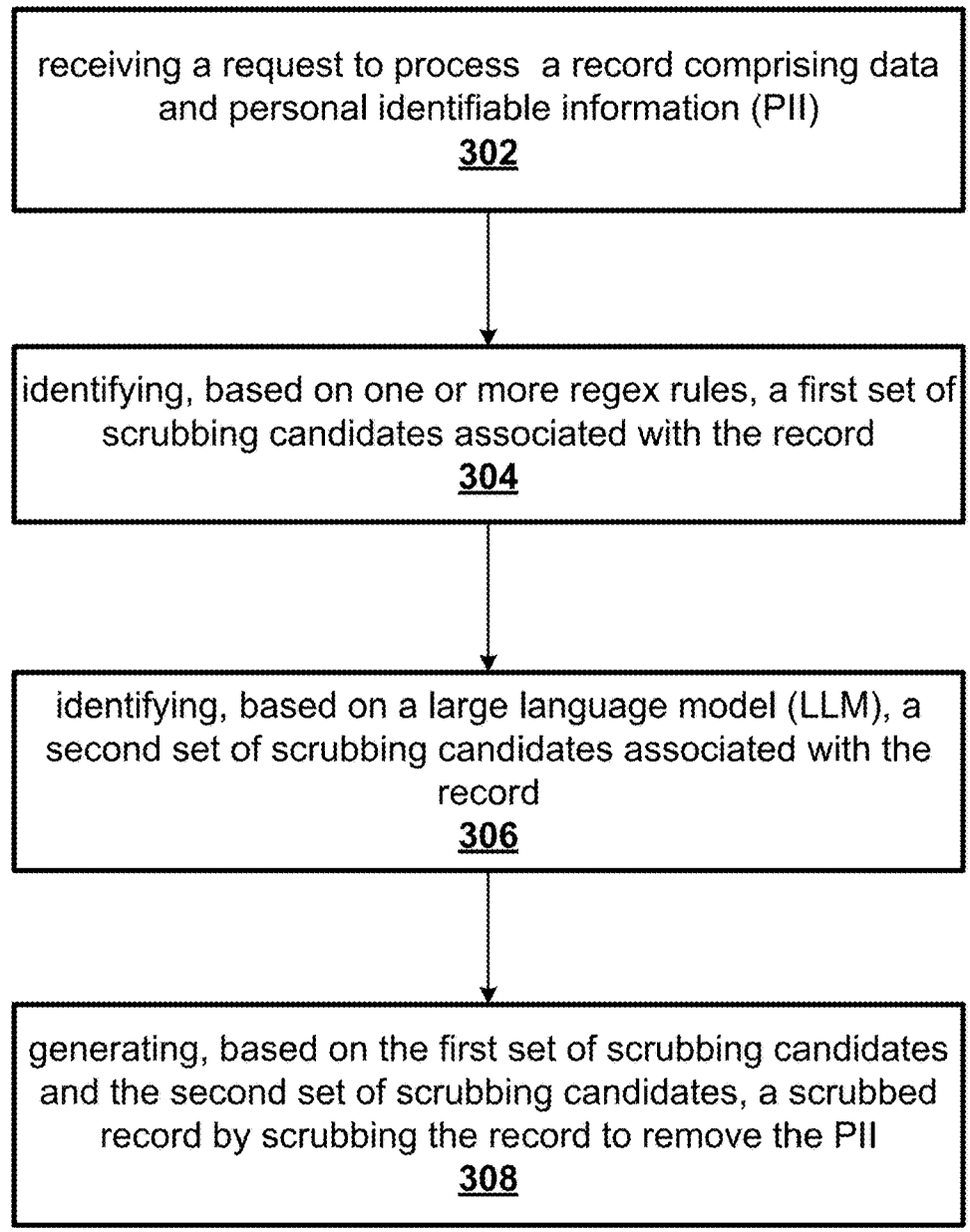
FIG. 3 is a flow diagram depicting a method of scrubbing PII from records using patterns and LLMs, according to some embodiments.

FIG. 3 is a flow diagram depicting a method of scrubbing PII from records using patterns and LLMs, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 300 may be performed by a PII scrubbing management (PSM) system, such as the PSM system 104 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving a request to process a record comprising data and personal identifiable information (PII). The method 300 includes the block 304 of identifying, by a processing device and based on one or more regex rules, a first set of scrubbing candidates associated with the record. The method 300 includes the block 306 of identifying, based on a large language model (LLM), a second set of scrubbing candidates associated with the record. The method 300 includes the block 308 of generating, based on the first set of scrubbing candidates and the second set of scrubbing candidates, a scrubbed record by scrubbing the record to remove the PII.

Figure 4:
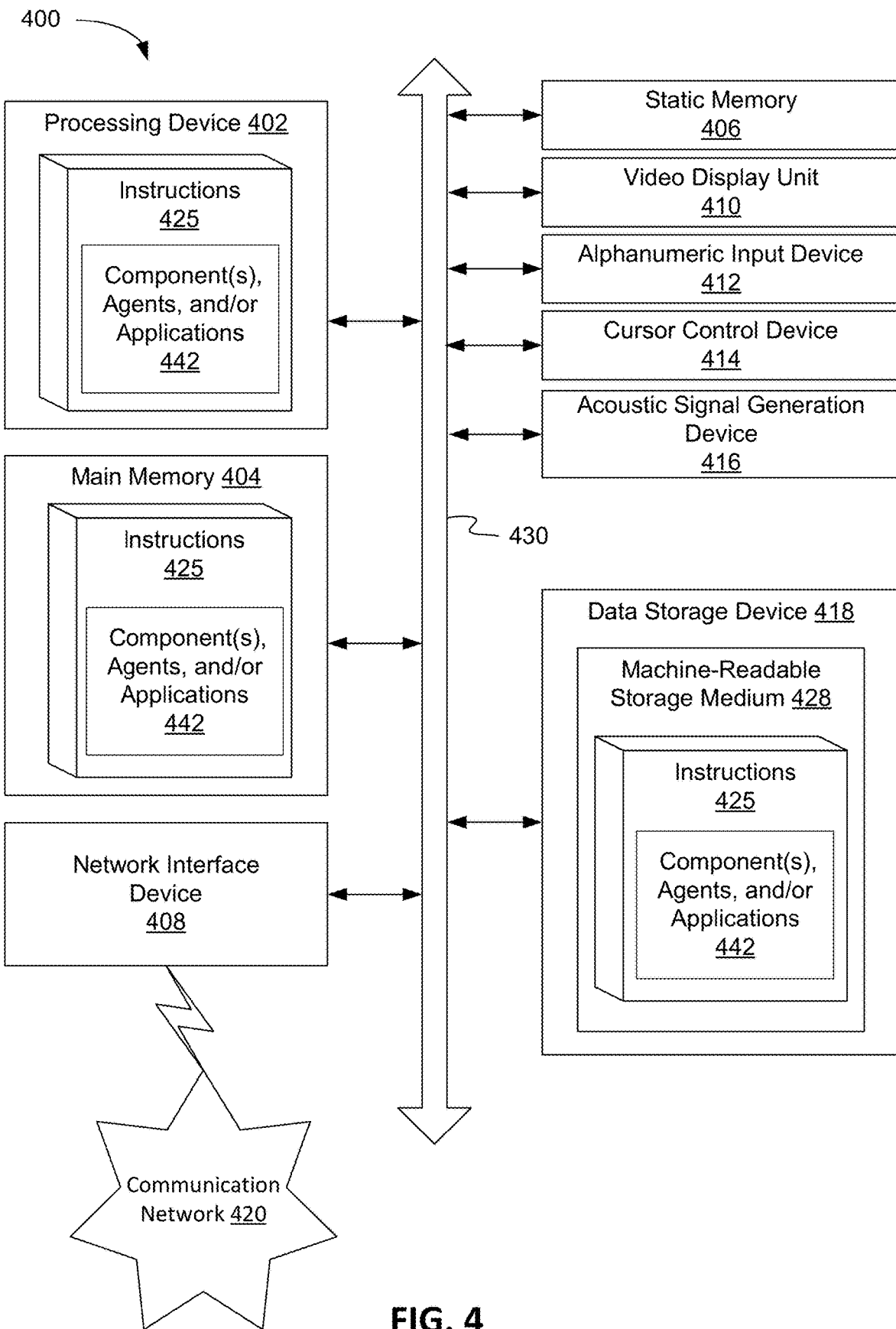
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general-purpose processor, a PLD, etc.) 402, a main memory 404 (e.g., synchronous dynamic random-access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components/programs/applications 442 (e.g., PSM agent 105, universal RR agent 108, PII scrubber models 109, classification model 110, integrator 114, topic RR agent 111, language RR agent 112, and file type RR agent 113 in FIG. 2A, etc.) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "maintaining," "identifying," "selecting," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
   receiving a request to process a record comprising data including sensitive data;
   identifying, based on one or more regex rules and a particular regex engine, a first set of scrubbing candidates associated with the record;
   identifying, by a processing device and based on a large language model (LLM), a second set of scrubbing candidates associated with the record, wherein identifying the second set of scrubbing candidates comprises training, using training data, the LLM to classify the record by generating, based on the record, one or more classification parameters indicative of at least one of a topic type of the record, a language type of the record, or a file type of the record; and selecting, based on the one or more classification parameters, the particular regex engine from a plurality of regex engines each respectively comprising different sets of regex rules; and
   generating, based on the first set of scrubbing candidates and the second set of scrubbing candidates, a scrubbed record by scrubbing the record to remove the sensitive data.

2. The method of claim 1, wherein identifying the first set of scrubbing candidates comprises:
   generating, based on the one or more regex rules, a plurality of labels associated with a plurality of words of the record, each label indicates whether a respective word of the plurality of words corresponds to the sensitive data.

3. The method of claim 2, wherein identifying, based on the LLM, the second set of scrubbing candidates associated with the record comprises:
   training, using training data, the LLM to generate, based on the record, a plurality of tokens associated with a plurality of scores, each score indicates a likelihood of a respective token being associated with a particular sensitive dataset.

4. The method of claim 3, further comprising:
   generating, based on the plurality of labels and the plurality of tokens associated with the plurality of scores, a third set of scrubbing candidates; and
   wherein generating, based on the first set of scrubbing candidates and the second set of scrubbing candidates, the scrubbed record by scrubbing the record to remove the sensitive data is further based on the third set of scrubbing candidates.

5. The method of claim 1, wherein the request comprises an indication of a particular scrubbing procedure, and further comprising:
   selecting the particular scrubbing procedure from a plurality of scrubbing procedures; and processing the record according to the particular scrubbing procedure.

6. The method of claim 1, further comprising:
storing the scrubbed record in a data storage;
receiving, from a client device, a second request for the record; and
providing the scrubbed record to the client device.

7. The method of claim 1, comprising:
training, using training data, a second LLM model to predict, based on the record, a plurality of performances associated with a plurality of scrubbing procedures, wherein the training data comprises a mapping between a plurality of historical records and historical performances of the plurality of scrubbing procedures.

8. The method of claim 7, further comprising:
selecting an optimal scrubbing procedure of the plurality of scrubbing procedures corresponding to an optimal performance of the plurality of performances; and
processing the record according to the optimal scrubbing procedure responsive to selecting the optimal scrubbing procedure.

9. A system comprising:
a memory; and
a processing device, operatively coupled to the memory, to:
receive a request to process a record comprising data including sensitive data;
identify, based on one or more regex rules, a first set of scrubbing candidates associated with the record;
identify, based on a large language model (LLM), a second set of scrubbing candidates associated with the record, wherein to identify the second set of scrubbing candidates, the processing device is further to train, using training data, the LLM to classify the record by generating, based on the record, one or more classification parameters indicative of at least one of a topic type of the record, a language type of the record, or a file type of the record; and select, based on the one or more classification parameters, the particular regex engine from a plurality of regex engines each respectively comprising different sets of regex rules; and
generate, based on the first set of scrubbing candidates and the second set of scrubbing candidates, a scrubbed record by scrubbing the record to remove the sensitive data.

10. The system of claim 9, wherein to identify the first set of scrubbing candidates, the processing device is further to:
generate, based on the one or more regex rules, a plurality of labels associated with a plurality of words of the record, each label indicates whether a respective word of the plurality of words corresponds to the sensitive data.

11. The system of claim 10, wherein to identify, based on the LLM, the second set of scrubbing candidates associated with the record, the processing device is further to:
train, using training data, the LLM to generate, based on the record, a plurality of tokens associated with a plurality of scores, each score indicates a likelihood of a respective token being associated with a particular sensitive dataset.

12. The system of claim 11, wherein the processing device is further to:
generate, based on the plurality of labels and the plurality of tokens associated with the plurality of scores, a third set of scrubbing candidates; and
wherein to generate, based on the first set of scrubbing candidates and the second set of scrubbing candidates, the scrubbed record by scrubbing the record to remove the sensitive data is further based on the third set of scrubbing candidates.

13. The system of claim 9, wherein the request comprises an indication of a particular scrubbing procedure.

14. The system of claim 13, wherein the processing device is further to:
select the particular scrubbing procedure from a plurality of scrubbing procedures; and
processing the record according to the particular scrubbing procedure.

15. The system of claim 9, wherein the processing device is further to:
store the scrubbed record in a data storage;
receive, from a client device, a second request for the record; and
provide the scrubbed record to the client device.

16. The system of claim 9, wherein the processing device is further to:
train, using training data, a second LLM model to predict, based on the record, a plurality of performances associated with a plurality of scrubbing procedures, wherein the training data comprises a mapping between a plurality of historical records and historical performances of the plurality of scrubbing procedures.

17. The system of claim 16, wherein the processing device is further to:
select an optimal scrubbing procedure of the plurality of scrubbing procedures corresponding to an optimal performance of the plurality of performances; and
process the record according to the optimal scrubbing procedure responsive to selecting the optimal scrubbing procedure.

18. A non-transitory computer-readable medium storing instructions that, when execute by a processing device, cause the processing device to:
receive a request to process a record comprising data including sensitive data;
identify, by the processing device and based on one or more regex rules, a first set of scrubbing candidates associated with the record;
identify, based on a large language model (LLM), a second set of scrubbing candidates associated with the record, wherein to identify the second set of scrubbing candidates, the processing device is further to train, using training data, the LLM to classify the record by generating, based on the record, one or more classification parameters indicative of at least one of a topic type of the record, a language type of the record, or a file type of the record; and select, based on the one or more classification parameters, the particular regex engine from a plurality of regex engines each respectively comprising different sets of regex rules; and
generate, based on the first set of scrubbing candidates and the second set of scrubbing candidates, a scrubbed record by scrubbing the record to remove the sensitive data.

* * * * *